(12) United States Patent
Semarjian et al.

(10) Patent No.: US 11,195,221 B2
(45) Date of Patent: Dec. 7, 2021

(54) SYSTEM RENDERING PERSONALIZED OUTFIT RECOMMENDATIONS

(71) Applicant: The Mada App, LLC, Novelty, OH (US)

(72) Inventors: Madison Semarjian, New York, NY (US); Zank Bennett, San Diego, CA (US); Andrey Volkov, Kherson (UA)

(73) Assignee: The Mada App, LLC, Novelty, OH (US)

(*) Notice: Subject to any disclaimer, the term of this patent is extended or adjusted under 35 U.S.C. 154(b) by 76 days.

(21) Appl. No.: 16/713,132

(22) Filed: Dec. 13, 2019

(65) Prior Publication Data
US 2021/0182934 A1  Jun. 17, 2021

(51) Int. Cl.
*G06Q 30/06* (2012.01)
*G06N 20/00* (2019.01)

(52) U.S. Cl.
CPC ......... *G06Q 30/0631* (2013.01); *G06N 20/00* (2019.01); *G06Q 30/0627* (2013.01)

(58) Field of Classification Search
CPC ............................................. G06G 30/06–08
See application file for complete search history.

(56) References Cited

U.S. PATENT DOCUMENTS

| | | | |
|---|---|---|---|
| 2009/0037295 A1* | 2/2009 | Saul | G06Q 30/0603 705/26.64 |
| 2010/0313141 A1* | 12/2010 | Yu | G06Q 30/02 715/747 |
| 2014/0035913 A1* | 2/2014 | Higgins | G06Q 30/00 345/420 |
| 2014/0201028 A1* | 7/2014 | Bhardwaj | G06K 9/4642 705/26.7 |
| 2016/0026926 A1* | 1/2016 | Yeung | G06Q 30/0269 706/12 |
| 2016/0132787 A1* | 5/2016 | Drevo | G06N 20/10 706/12 |

OTHER PUBLICATIONS

Machine Learning : Cosine Similarity for Vector Space Models (Part III), Christian S. Perone, disclosing the use of Cosine Similarity in machine learning products to calculate similarity between different documents. Dec. 9, 2013. (Year: 2013).*

* cited by examiner

*Primary Examiner* — Ming Shui
(74) *Attorney, Agent, or Firm* — Benesch, Friedlander, Coplan & Aronoff LLP

(57) ABSTRACT

A system recommends outfits to a user by communicating through a database layer and a computing layer. The system transmits a sequence of onboarding outfits corresponding to a plurality of product attributes and generates a dynamic user profile in response to an onboarding process. The system trains the computing layer during a computing session based on the dynamic user profile to generate a plurality of recommendations The recommendations are transmitted to a remote end-user device ranked according to the dynamic user profile.

11 Claims, 4 Drawing Sheets

| Product_ID | Categor_Skirt | Category_Blouse | ... | Category_Earrings | Style_Preppy | Style_Trendy | ... | Style_Cool |
|---|---|---|---|---|---|---|---|---|
| p1111 | 0 | 1 | ... | 0 | 0 | 1 | ... | 0 |
| p2222 | 1 | 0 | ... | 0 | 1 | 0 | ... | 0 |
| p3333 | 0 | 0 | ... | 0 | 1 | 0 | ... | 0 |
| Outfit Profile (o444) | 1 | 1 | ... | 0 | 0.6667 | 0.3333 | ... | 0 |

Outfit Profile = Aggregation of Product Profiles (Maximum for Category Attributes and Average for Others)

| outfit_ID | Categor_Skirt | Category_Blouse | ... | Category_Earrings | Style_Preppy | Style_Trendy | ... | Style_Cool |
|---|---|---|---|---|---|---|---|---|
| o444 | 1 | 1 | ... | 0 | 0.6667 | 0.3333 | ... | 0 |
| o111 | 1 | 0 | ... | 1 | 0.5000 | 0.2500 | ... | 0.2500 |
| o777 | 1 | 0 | ... | 0 | 0 | 1 | ... | 0 |
| o222 | 0 | 1 | ... | 0 | 0.3333 | 0 | ... | 0.3333 |
| User Profile | 0.7500 | 0.5000 | ... | 0.2500 | 0.3750 | 0.3958 | ... | 0.1458 |

User Profile = Average of the Last N Outfit Profiles Liked by the User

FIG. 2

SYSTEM RENDERING PERSONALIZED OUTFIT RECOMMENDATIONS

BACKGROUND OF THE DISCLOSURE

1. Technical Field

This disclosure relates to simulating human intelligence, and more specifically to artificial intelligence that learns fashion preferences and makes fashion recommendations.

2. Related Art

Traditional shopping requires visits to many retailers to find that perfect outfit. Typically, buyers look at many outfits and seek personnel advice when making selections. The shopping experience is time consuming and physically exhausting. The mental fatigue of wanting to make the right decision is similar to the weariness that comes with online shopping. Buyers must page through a variety of products displayed across many sites. They are forced to make choices for clothes in isolation, balancing price against appearances while tracking quality, quantities, sizes, etc.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals designate to corresponding parts throughout the different views.

FIG. 2 is an exemplary table illustrating the product attributes and a dynamic user profile.

DETAILED DESCRIPTION

Figure 1:
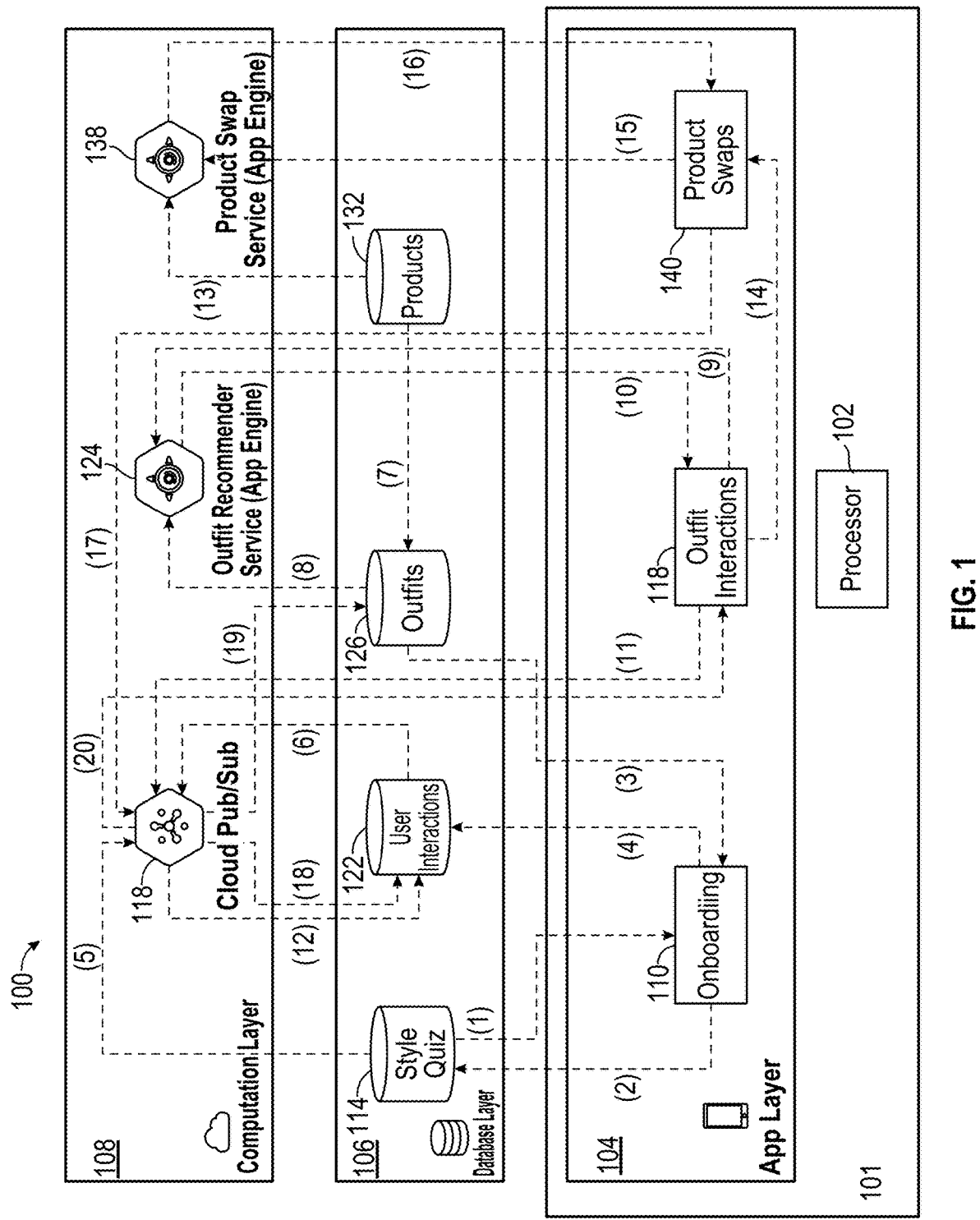
FIG. 1 is an exemplary machine learning system that provides outfit recommendations.

The disclosed on-line and mobile shopping systems and processes (referred to as a system or systems) allow buyers to avoid the physically exhausting and noisy environments of crowded stores and the mind-numbing browsing that happens in virtual malls. Users need not navigate through countless reviews and odd-lot recommendations that require even more time than physically shopping. Poor experiences often peak with inflated expectations and poor shopping experiences.

The novel machine learning framework provides end-to-end recommendations via processes that transform a user's preferences into concise data structures that provide access to unique product lines. The product lines provide users with a distinct collection of recommendations of clothing and accessories. The machine learning framework helps users discover entire outfits based on their own personal preferences and virtual shopper recommendations. This unique combination identifies elusive combinations. The disclosed framework is responsive to changing user preferences and sometimes coax users out of their comfort zones.

The novel machine learning framework minimizes a potential problem that prevents some systems from drawing inferences. This is frequently caused by a lack of a user profile or a lack of sufficient information to model a user's preferences. This issue generally comes with new users and new items. In the disclosed system, computing challenges are mitigated by rapidly acquiring training data through active learning. Machine learning training data are generated by discovering hidden preference through subtle on-boarding processes. Some systems interrogate users and others observe behavior by monitoring user preferences to on-boarding outfits that may be rendered during a registration process, for example. Other systems execute multi-task learning frameworks that implements a combination of these processes and/or other processes that rapidly acquire preference data.

Some systems may further minimize the challenges of acquiring changing preference data through dynamic personalization and further monitoring user interactions. A user's personal preference may change over time for many reasons. Changes may occur because of a user's age, a change in seasons, different career choices, etc. Sometimes, a user's state of mind or his/her emotion at the time of a purchase may change the user's preferences that is only detectable during the user's computing session. The machine learning framework provide flexible processes that rapidly generate and/or adjust user profiles dynamically, and in some applications in real time, to capture changes. Some learning maybe part of the on-boarding interactions, for example, others may be based on mining behavioral or sales history, for example, and others by other processes.

In operation, the rapid acquisition of preference data is transmitted to a computing engine that receives, analyzes, and transforms the preference data into a dynamic user profile that describes the user's characteristics and preferences. These characteristics and preferences are processed to generate recommendations. Some deep personalization services provided at an outfit level are based on predicted similarities between outfits and user characteristics reflected in the dynamic user profiles. A rendered similarity scores may rank which outfits are presented to users. In some applications, the deep personalization services and rankings are based on more granular user data that reflects the user's state of mind, emotion and/or interests. The system's interfaces facilitate substitutions between items (e.g., often within common product categories), rendering further personalization.

FIG. 1 illustrates a system 100 that executes the machine learning framework that provides clothing recommendations. The distributed system 100 include an application layer 104, a database layer 106, and a computing layer 108. The database 106 layer may be a data warehouse that contains several database instances 114, 122, 126, and 132. While the illustrated data warehouse is distributed over several computers and contains several database instances in FIG. 1, access is transparent to the client requesting access. Thus, common commands retrieve, analyze, and/or provide all of the stored information in response to client requests. The computing layer 108 includes multiple engines, with each engine executing a specific function or program. For example, the product swap engine shown in FIG. 1 includes software that executes product exchanges.

In FIG. 1, the database layer 106 persist data from many sources in a variety of formats. It retains data relating to the onboarding style quizzes, corresponding responses, onboarding outfits, outfit selection responses, outfit profiles, and dynamic user profiles that are presented in the exemplary of tables of FIG. 2. The database layer may further store the ranked outfits shown in the exemplary table of FIG. 3. Since accesses to database layer 106 may be slow in some systems, alternate systems use in-memory or main-memory databases that includes non-volatile random access that provides faster and more predictable performance and run at a higher operating speed, while maintaining the data in memory in the event of a power interruption or failure. In yet another alternate system, the database instances 114, 122, 126, and 132 may comprise a unitary database. The computing layer 108, which may be local or cloud based includes the data structures and services that render real-time or near-real time results, such as those used in the publish and subscribe queue 120 and the low-latency services that are provided through the recommendations service application engine 124 and the product swaps service engine 138.

In an exemplary use case, the dynamic user profiles 240 (shown in FIG. 2) are generated in part through queries. The style quiz 114 shown in FIG. 2 enables users to share their open and hidden preferences while protecting their privacy through preference elicitations at step 1. Privacy is maintained, in part, by generating and storing dynamic user profiles 240 in an encrypted database layer 106 that stores a unique identifier, demographic and content data, and the user clothing preferences off of the application layer 104 in step 2. In some use cases, preference elicitations may be captured through image choice questions, where image choices or universal resource locators (URL) to them and questions presented via text are retrieved from the outfits database instance 126 that renders images and text that is rendered to the on-boarding users. The system may allow the user to respond by selecting one (e.g., mutually exclusive answers) or multiple answers from a defined list of choices. On questions that allow for a single answer choice, such as expressing a like or a dislike of a clothing image, the user's preferences are captured at the onboarding engine, associated with a unique outfit identifier 242 linked to the image and the user's own unique identifier before it is stored in the user interaction database instance 122.

In the system of FIGS. 1 and 2, the outfit identifier 242 is automatically associated with an output profile 204 before image choice questions are rendered through the app layer 104. The association may be generated from empirical data that may be categorized by a predetermined number of attributes. In FIGS. 1 and 2, an outfit profile 204 may include one or many product attributes that further classify product attributes 208 to 220 and non-product attributes 224 to 230. The dynamic user profile 240 is generated in real time (e.g., during the computing session) in some systems and retained from prior computing sessions in other systems. The user's clothing preferences are dynamically updated with each image choice, and in some use cases, may be updated when the user (e.g., the respondent) fails to respond before submitting a content page. In FIG. 1, the computing layer 108 may assign a weight or points to the user clothing preferences that reflect answers to the style quiz and the image choice questions rendered by the outfits instance database 126. The responses are retained in the user interaction database instance 122 in the database layer 106.

In the exemplary two-stage preference elicitation process described above, the process generates sufficient information to generate a machine learning training data set that models the user's clothing preferences, and more specifically outfit preferences. The term outfit generally encompasses a set of clothing and accessories that is often suitable for an event like a formal event, for example. Optionally, a recursive process model one or more machine learning algorithms that is part of the machine learning framework. The machine learning algorithm is trained to minimize a loss function—such as a mean squared error (when mean is used) or mean absolute error (when median is used), for example—by recursively splitting the machine learning training data in a way that maximizes a recognition of the user's outfit preference criterion in this example until a limit threshold is met. The criterion is defined to minimize the loss function of each split.

In an exemplary use case, the machine learning training data is generated from the responses to the style quiz 114 in step 5 and user interactions 115 to image choice questions in step 6. The machine learning training data incudes data that makes up the dynamic user profile 240, as well as updated data from step 11, where outfit profiles 204 are being presented to the user during the outfit recommender service 124 in step 10.

The time needed to train the machine learning algorithms are proportional to the number of splits that are evaluated. Since small changes in the split may not significantly affect performance, some methods group outfit features into bins and split the bins based on statistics allowing the machine learning algorithms to train on small training data sets quickly (e.g., during the user's computer session). In some alternate systems, the machine learning training data and machine learning algorithms are continuously updated (in some systems, during computing sessions) in response to an asynchronous event or new machine learning training data sets. The new training data sets are generated by removing preferences that do not result in preferred outfits and/or result in high rejection rates by replacing them or supplementing them iteratively with statistically significant preferences that have higher predictive rates. The term "algorithm" generally refers to sets of instructions to carry out one or more particular tasks usually executed by one or more processors. The term encompasses devices that render models that impersonate human behaviors, such as recognizing a user's outfit preferences automatically and rendering outfit recommendations.

Figures 3, 4:
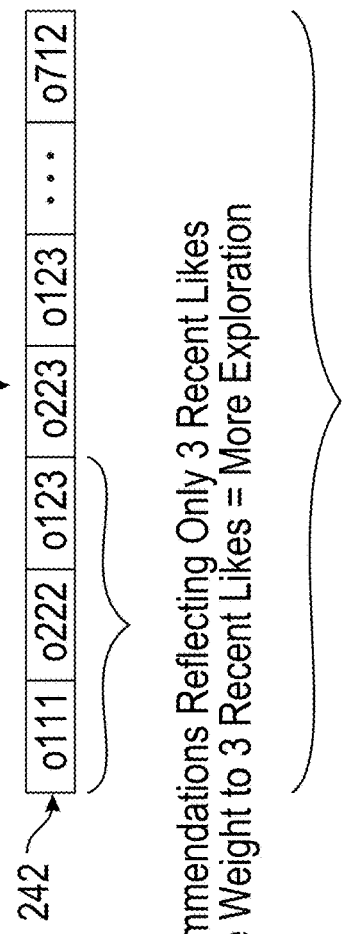
FIG. 3 illustrates an exemplary ranking.
FIG. 4 is an exemplary truncated data structure.

In the on-board process described above, the trained machine learning algorithm resident to the outfit recommender service engine or app engine 104 may identify a subset of outfit profiles, such as those designated by identifiers o888 and o999 in FIG. 3 that were not previously shown to the user together with the outfit profile associated with identifier o444 that was shown to the client during the onboarding process. Because the outfit profiles are ranked, some profiles are not shown such as the outfit associated with identifier o555 due to their rankings below a predetermined threshold, or some profiles are not shown again such as outfit profile associated with identifier 0444.

With the machine learning algorithms trained, users receive personalized outfit recommendations through the outfit recommendation interactions engine 118. The outfit recommendation interactions 118 may occur after the dynamic user profiles 240 is updated. In response to a recommendation request to the computing layer 108 at step 9, the user device 101 receives the outfit recommendation at step 10 though the computing layer 108 and more specifically from the outfit recommender service engine 124. The outfit recommendation may include a subset of outfits rendered in one or more profiles as shown in FIG. 3.

In another alternate system, the outfit recommendation interactions 118 may be served from a cloud-based outfit recommender service engine 124. In this alternative, the computation layer is served by the cloud, making the system scalable and easy to migrate to different operating platforms. In another variation, the encrypted database layer 106 storing dynamic user profiles 240 may be fully or partially served by the cloud, allowing the system to keep track of the state of user's interactions between computing sessions making the system a stateful machine.

FIG. 2 is an exemplary matrix 200 tabulating the product attributes 208 to 230 associated with an exemplary product ID 206. The table shows exemplary product attributes 208 to 230 that are processed to derive an outfit profile 204 and a dynamic user profile 240. The exemplary product attributes may include exemplary product category attributes 208-220 and exemplary non-product category attributes 224-230. Each product attribute 208 to 230 shown in this example may be assigned a discrete value. Here, a value of "1" corresponds to the presence of the product attribute and a value of "0" corresponds to an absence of the product attribute or corresponds to a non-relevant product attribute.

An example of the user's outfit recommendation interactions 118 is shown through the text-box below. As shown, a user may submit a request, such as a hypertext protocol request (http) at step 9 to an outfit recommender service engine 124 that requests ten recommendations for user id 5, given the user's history of outfit likes (e.g., see dynamic user profile 240 corresponding to outfit profiles o444, o111, o777 and o222 in FIG. 2). Further, the recommended outfits correspond to the product attributes of style values designated "Trendy" 226 and "Cool" 230. It further reflects the summer season 280 and the user's aged 18 to 22 years old 270, and the price of the outfit should be between $100 and $400. A sample http request may include:

```
curl 0.0.0.0:8081/get_recommendations -X POST -H "Content-Type: application/json" -d
"{"user_id":     5,      "likes":["o444",     "o111",     "o777",     "o222"],     "rejects":[ ],"n_recs":10,
"version":"n_last_10", "filter_dict":{"occasion": [ ], "style": ["Trendy", "Cool"], "season":
["summer"],"age":      ["18-22"],     "body_type":      [ ]},     "price_filter_dict"
:{"greater_or_equal_to":100, "lesser_or_equal_to":400}}"
```

Based on user's onboarding responses at steps 2 and 4 to the products associated with product IDs p1111, p2222 and p3333, computer layer 108 computes an outfit profile 204, such as an exemplary outfit profile associated with 0444 as representative of one of the outfit profiles which are used to determine user's current preferences in the dynamic user profile 240. In this alternative use case, each of the product category attributes 208-220 aggregate to a respective maximum value 244-250. For each of the non-product category attributes 224-230, the system determines a respective average value 252-260. For example, a numerical value of "1" is the respective aggregated maximum values 244 and 246 for product category attributes 208 and 210, and the numerical value of "0" is the respective aggregated maximum value 250 for product category attribute 220. The respective average value 252 is derived form a calculation such as an average, for example, of the three attributes (0+1+1)/3 to yield a numerical value of "0.6667" for non-product category attribute 224. Likewise, a numerical value of "0.3333" and a value of "0" are the respective average values 254 and 260 for the non-product category attributes 226 and 230. The respective aggregated maximum values 244-250 for product category attributes 208-220 and the respective average values 252-260 for the non-product category attributes 224-230 of the other outfit profiles (i.e., o111, o777 and o222) identified during the remaining onboarding responses may then be similarly calculated for the outfit profile o444.

In a similar process, the computer layer 108 may generate the dynamic user profile 240 over a defined number of outfit profiles o444-o222 in real time. As shown in FIG. 2, a predetermined number of responses may require liked responses to four outfit profiles o444 to o222. The user profile 240 may share common product attributes (e.g., the product category attributes 208-220 and the non-product category attributes 224-230) with the outfit profiles 204. In this use case explained through FIG. 2, the product category attribute 208 of the user profile 240 is determined to be the value "0.7500" (representing a numerical vector) by averaging the aggregated maximum values (1+1+1+0)/4 over the four outfit profiles o444-o222. Other product category attributes 210 and 220 are derived in a similar way, with respective averaged values of 0.5000 and 0.2500 (numerical vectors). Non-product category attributes 224, 226 and 230 are calculated in like manners with averaged values of 0.3750, 0.3985 and 0.1458 (representing numerical vectors), respectively.

In response, an exemplary machine outfit recommender service 124 returns an ordered series of outfit IDs 242 at step 10 to the user via the outfit recommendation interactions 118 in the application layer 104. The outfit recommendation interactions 118 may update the user interactions 122 in the database layer 106 through the machine publish and subscribe queue 120 shown at step 11. Periodically, the newly added preferences are persisted to the user interactions table 122 in the database layer 106 to maintain the interaction history in this exemplary user case between user computer sessions as shown in step 9.

To generate recommendations, some outfit recommender service application engines 124 compare a similarity between static outfit profiles from an outfit database 126 at step 10 and the dynamic user profile 240. The outfits with outfit profiles may be the most similar to the current state of the dynamic user profile 240. An outfit profile 204 not previously shown to the user with an outfit ID may be created by aggregating the product profiles at step 11. A product profile in this example, comprises a collection of product attributes (subcategory 208-220, occasion, style 224-230 and season 280) where a value of "1" corresponds to a presence of the attribute in the product and a value of 0 indicates its irrelevance.

FIG. 3 is an exemplary ranking of outfits for recommendation. The ranking may reflect a similarity (the cosine similarity column) between the outfit profile 204 and the user profile 240. Values for different filter attributes were generated by comparing the value of the attributes 224-280 in the outfit profiles (e.g., o444 to 0555 in FIG. 3) and a cut-off threshold of "0" established. If the attribute value 224-280 is greater than or equal to the cut-off value, then the outfit profile passes the filter. In FIG. 3, outfit profiles o444 to o999 pass the filter attributes (e.g., cut-off value >0), while outfit profile o555 does not.

Since both the outfit profile 204 and the user profile 240 comprise numerical vectors, similarities in respective product attributes between each outfit profile 204 and the calculated user profile 240 may be obtained prior to displaying the outfits that make up respective output profiles 203. As shown in FIG. 3, a cosine similarity may be applied to obtain a similarity score 290. A similarity score 290 may be computed between the current state of the user profile 240 and the qualified outfit profiles that satisfy the value of the filters that are passed in the request and have not been shown to the user. A cosine similarity score 290 close to a value of "1" may indicate that outfit profiles o444, o888, o999 are qualified outfits to be recommended. Yet, only outfit profiles o888 and o999 will be recommended to the user when satisfying both the value of the filters in the outfit recommendation request at step 9 and having high cosine similarity scores (0.94 and 0.91). In addition, outfits associated with outfit profiles o888 and o999 have not been shown to the user. However, outfits associated with outfit profile o444 are not recommended despite having a high cosine similarity score of 0.95. Due to outfit profile o555's low similarity score of 0.65 (e.g., <0.700), outfit profile o555 is not recommended because it does not pass the age attribute 270 filter value. Accordingly, only two outfits associated with qualified outfit profiles o888 and o999 are ranked for outfit recommendations.

FIG. 4 depicts exemplary truncated likes of outfits (identified by outfit IDs 242) for user profile determination. In this exemplary use case, the larger number of outfit profile "likes" the greater the accuracy of the machine learning algorithm.

The product swap engine 150 of FIG. 1 may accept http requests at step 15 and return a list of similar items at step 16 based on a measured item-to-item similarity computed by blending an item image and text description at step 13. An exemplary HTTP request for the product swap service 150 may render the following code:

```
curl 0.0.0.0:8081/product_swap -X POST -H "Content-Type: application/json" -d
"{"product_id": 5,"n_recs":10,"filter_diet":{"occasion": [ ], "style": ["Trendy", "Cool"],
"season": ["summer"],"age": ["18-22"], "body_type": [ ]},
"price_filter_dict":{"greater_or_equal_to":50, "lesser_or_equal_to":100}}"
```

Figure 5:
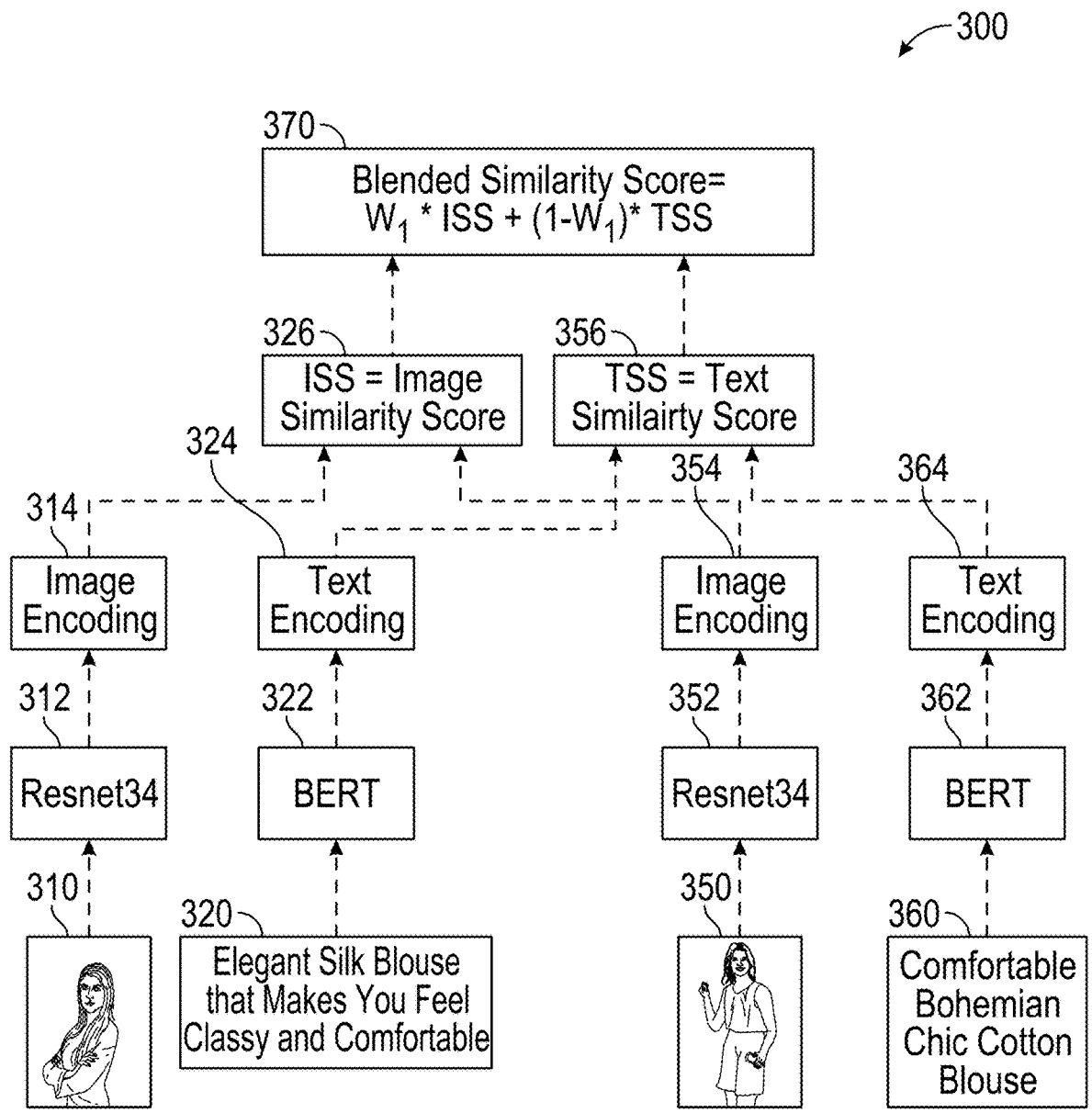
FIG. 5 is a blended similarity scoring.

FIG. 5 illustrates exemplary calculations of bended similarity score using text and image encodings. The blended item-to-item similarity score 370 may be calculated by a weighted average of two scores, namely, an Image Similarity Score (ISS) 326 and a Text Similarity Score 356. The ISS 326 may be computed by calculating a cosine similarity scores 290 between the encodings of the two item images (e.g., image encodings 314/354) based on a pre-trained model. The text similarity score 356 may be computed by calculating a cosine similarity score 290 between the encodings of the two item description texts (text encodings 324/364) based on the pre-configured model. Accordingly, products which may qualify for swapping may also be ranked based on the similarity scores and only products that satisfy the filter conditions that would be retained in recommendations qualified for product exchanges.

In yet another alternate system, the process flows and system functionality described above and those shown in FIGS. may execute automatically through a memory and a processor 102. The system comprises a processor 102, a non-transitory media, such as a memory (the contents of which are accessible and executable by the processor 102) and an I/O interface. The I/O interface connects devices and points of interaction, such as a phone (e.g., a mobile phone) an SMS enabled device, a computer and/or an interface, to local and/or remote applications, such as, for example, additional local and/or remote retail service sites. The memory stores instructions, which when executed by the processor 102, causes the components to render some or all of the functionality associated with recommending outfits. The memory stores instructions, which when executed by the processor 102, causes the system to render the functionality associated with the computing layer 108, the database layer 106, and/or the app layer 104.

The memory and/or storage disclosed may retain an ordered listing of executable instructions for implementing the functions described above in a non-transitory computer code. The machine-readable medium may selectively be, but is not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory may comprise a single device or multiple devices that may be disposed on one or more dedicated memory devices or disposed on the processor 102 or another similar device. The engines may comprise a processor or a portion of a program that executes or supports recognition system or processes. When functions, steps, etc. are said to be "responsive to" or occur "in response to" another function or step, etc., the functions or steps necessarily occur as a result of another function or step, etc. It is not sufficient that a function or act merely follow or occur subsequent to another. Further, the term "engine" generally refers to a device, processor, and/or program executed by a hardware processor that manages and manipulates data as programmed to execute the functionality associated with the device. Computer-mediated technology enables human communication that occurs through two or more electronic devices. The devices may provide input from various sources including, but not limited to, audio, text, images, video, augmented reality, etc. A session is the time during which a program accepts input and processes information about a particular species. For insurance, it is the time during which the user transacts an outfit recommendation rather than the entire time the user accesses resources on a retail site.

While each of the systems and methods shown and described herein operate automatically and operate independently, they also may be encompassed within other systems and methods including any number (N) of iterations of some or all of the process used to render outfit recommendations. Alternate systems may include any combination of structure and functions described or shown in one or more of the FIGS. These systems are formed from any combination of structures and functions described. The structures and functions may process the same, additional, or different input.

Some alternate systems illustratively disclosed herein may be practiced in the absence of any element or function that is not specifically disclosed herein. Thus, in these alternate systems, when elements and/or functions are not disclosed herein, those alternate systems are devoid of or operate in the absence of those non-disclosed elements and/or functions. In yet another alternate system, the disclosed elements and functions are recited individually, rather than as an inseparable whole. In these alternate systems, one or more but not all of the recited elements and functions disclosed herein may be completely lacking or may be excluded from the systems. Further, some or all of the disclosed steps need not be executed in sequence (e.g., there is no order-of-steps) in alternative systems.

Further, the functions, acts or tasks illustrated in the FIGS. or described herein may be executed in response to one or more sets of logic or instructions stored in or on non-transitory computer readable media as well. The functions, acts, or tasks are independent of the particular type of instructions set, storage media, processor or processing strategy, and may be performed by software, hardware, integrated circuits, firmware, micro code and the like, operating alone or in combination The disclosed on-line and mobile shopping system allows buyers to avoid the physically exhausting stores and the mind-numbing browsing that occurs in virtual malls. Users need not navigate through countless reviews and recommendations that require even more time than physically shopping. The novel machine learning framework provides end-to-end recommendations via processes that transform a user's preferences into concise data structures that provide access to unique product lines. The product lines provide users with a distinct collection of recommendations of clothing and accessories that comprise an outfit. The machine learning framework helps users discover entire outfits based on their own personal preferences and a virtual shopper recommendations in the form of an outfit recommender service or app engine 124. This unique combination identifies elusive combinations that is responsive to changing user preferences.

The novel machine learning framework minimizes cold-start problems that prevent some systems from drawing inferences. In the disclosed systems, computing challenges are mitigated by rapidly acquiring training data through active learning. Training data sets are generated by discovering hidden preference through subtle on-boarding processes. Some systems interrogate users and others observe behavior by monitoring user preferences to on-boarding outfits, for example. Other systems execute multi-task learning frameworks that implement a combination of these processes and/or other processes that rapidly acquire preference data.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

We claim:

1. A computer implemented method for recommending an outfit, comprising:
    executing, by at least one processor, a program code stored in a non-transitory computer-readable medium programmed to recommend an outfit to a user, comprising:
    communicating with a database layer and a computing layer;
    transmitting a sequence of onboarding outfits transmitted from the database layer corresponding to a plurality of product attributes;
    generating a dynamic user profile in response to responses received from the transmitting of the sequence of onboarding outfits during a computing session;
    training the computing layer during the computing session based on the dynamic user profile to generate a plurality of outfit recommendations by comparing similarities between outfit profiles from the database layer and the dynamic user profile, wherein the similarities comprising: taking a cosine similarity index between the outfit profiles of the outfit recommendations and the dynamic user profile, wherein each outfit recommendation in the outfit recommendations is ranked according to the cosine similarity index;
    wherein the training of the computing layer further comprising:
        assigning a filter value to each of a plurality of first responses, wherein the filter value of each first response is used to select subset of outfit recommendations, wherein each outfit recommendation comprises product identifications that match the filter value, and the outfit recommendation has not been previously shown to a user; and
        tabulating a corresponding outfit profile table according to a plurality of product identifications with corresponding product attributes comprising product category attributes and non-product category attributes, wherein each product attribute is assigned to either a numerical value 1 to correspond to presence of the product attribute, or a numerical value of zero to correspond to absence of the product attribute or not a relevant product attribute; and
        determining a respective outfit profile from the product identifications, by aggregating to a respective maximum value for each of the product category attributes and determining a respective average value for each of the non-product category attributes; and
    transmitting the plurality of outfit recommendation to the user device ranked according to the dynamic user profile.

2. The computer implemented method of claim 1, wherein an updated dynamic user profile is determined by averaging the aggregated maximum value of each product category attribute and averaging the averaged value for each non-product category attributes over a defined number of last outfit profiles liked.

3. The computer implemented method of claim 1, further comprising allowing an end user to swap out a particular product within a shown outfit with another product of similar or different category attribute and style attribute.

4. The computer implemented method of claim 1, wherein the application layer allows the user to virtual fit a selected outfit based on a specified body size and an uploaded picture of the user.

5. An outfit recommendation training method, comprising:
    receiving by an application layer of a user device, a sequence of onboarding questions and onboarding outfit images having corresponding plurality of product attributes from a database layer in a computing session;
    transmitting first responses to the sequence of onboarding questions to the database layer;
    transmitting second responses corresponding to each onboarding outfit image to the database layer;
    calculating by a machine learning engine in a computing layer, an updated dynamic user profile indicative of a user's current preferences; and
    training the machine learning engine in the computing layer, by processing the updated dynamic user profile to render an outfit recommendation in the computing session by comparing similarities between outfit profiles from the database layer and the dynamic user profile, wherein the similarities comprising: taking a cosine similarity index between the outfit profiles of the outfit recommendations and the dynamic user profile, wherein each outfit recommendation in the outfit recommendations is ranked according to the cosine similarity index;

wherein the training of the computing layer further comprising:

assigning a filter value to each of a plurality of first responses, wherein the filter value of each first response is used to select subset of outfit recommendations, wherein each outfit recommendation comprises product identifications that match the filter value, and the outfit recommendation has not been previously shown to a user; and tabulating a corresponding outfit profile table according to a plurality of product identifications with corresponding product attributes comprising product category attributes and non-product category attributes, wherein each product attribute is assigned to either a numerical value 1 to correspond to presence of the product attribute, or a numerical value of zero to correspond to absence of the product attribute or not a relevant product attribute; and determining a respective outfit profile from the product identifications, by aggregating to a respective maximum value for each of the product category attributes and determining a respective average value for each of the non-product category attributes; and wherein each outfit recommendation is associated with an outfit identification and a corresponding plurality of product attributes.

6. The method of claim 5, wherein the updated dynamic user profile is determined by averaging an aggregated maximum value of each product category attribute and averaging the averaged value for each non-product category attributes over a defined number of last outfit profiles liked by a user.

7. The method of claim 5, further comprising allowing the user to swap out a particular product within a shown outfit with another product of similar or different category attribute and style attribute.

8. The method of claim 5, wherein the application layer allows the user to virtual fit a selected outfit based on a specified body size and an uploaded picture of the user.

9. A non-transitory computer-readable medium that stores program code for recommending an outfit comprising:

communicating with a database layer, wherein the database layer transmits to an application layer resident to a remote device, a sequence of onboarding questions and onboarding outfit images having corresponding plurality of product attributes from the database layer;

generating an updated dynamic user profile in response to responses received from the sequence of onboarding questions and onboarding outfits transmitted to the application layer during a computing session;

training a computing layer during the computing session based on the updated dynamic user profile to generate a plurality of outfit recommendations to the application layer by comparing similarities between outfit profiles from the database layer and the dynamic user profile, wherein the similarities comprising: taking a cosine similarity index between the outfit profiles of the outfit recommendations and the dynamic user profile, wherein each outfit recommendation in the outfit recommendations is ranked according to the cosine similarity index;

wherein the training of the computing layer further comprising:

assigning a filter value to each of a plurality of first responses, wherein the filter value of each first response is used to select subset of outfit recommendations, wherein each outfit recommendation comprises product identifications that match the filter value, and the outfit recommendation has not been previously shown to a user; and tabulating a corresponding outfit profile table according to a plurality of product identifications with corresponding product attributes comprising product category attributes and non-product category attributes, wherein each product attribute is assigned to either a numerical value 1 to correspond to presence of the product attribute, or a numerical value of zero to correspond to absence of the product attribute or not a relevant product attribute; and determining a respective outfit profile from the product identifications, by aggregating to a respective maximum value for each of the product category attributes and determining a respective average value for each of the non-product category attributes; and transmitting to the application layer of a remote end-user device, the plurality of outfit recommendations that have been ranked according to the updated user profile.

10. The non-transitory computer-readable medium of claim 9, wherein the updated dynamic user profile is determined by averaging an aggregated maximum value of each product category attribute and averaging the averaged value for each non-product category attributes over a defined number of last outfit profiles liked by the user.

11. The non-transitory computer-readable medium of claim 9, further comprising the computing layer allowing the user to swap out a particular product within a shown outfit with another product of similar or different category attribute and style attribute.

* * * * *